United States Patent [19]

Sakai

[11] Patent Number: 4,850,937
[45] Date of Patent: Jul. 25, 1989

[54] SYSTEM FOR CONTROLLING THE PRESSURE OF OIL FOR A CONTINUOUSLY VARIABLE TRANSMISSION

[75] Inventor: Yasuhito Sakai, Higashimurayama, Japan

[73] Assignee: Fuji Jukogyo Kabushiki Kaisha, Tokyo, Japan

[21] Appl. No.: 198,391

[22] Filed: May 24, 1988

[30] Foreign Application Priority Data

May 28, 1987 [JP] Japan ................................ 62-134461
May 28, 1987 [JP] Japan ................................ 62-134464

[51] Int. Cl.$^4$ ............................................. F16H 11/02
[52] U.S. Cl. ........................................ 474/28; 74/867
[58] Field of Search ...................... 474/11, 12, 17, 18, 474/28, 69, 70; 74/865, 867, 868, 869

[56] References Cited

U.S. PATENT DOCUMENTS 4,478,105 10/1984 Yamamura et al. ................... 74/730
4,547,178 10/1985 Hayakawa et al. ................ 474/28 X
4,669,336 6/1987 Okada et al. ........................... 74/867

FOREIGN PATENT DOCUMENTS 57-161360 10/1982 Japan .

Primary Examiner—Thuy M. Bui
Attorney, Agent, or Firm—Martin A. Farber

[57] ABSTRACT

A continuously variable transmission has a selector device having a planetary gear device for selecting forward and reverse drives. The planetary gear device has a forward hydraulic chamber and a reverse hydraulic chamber for selectively providing a forward gear train and a reverse gear train. A high pressure oil pump is provided for supplying a transmission actuating oil having a high line pressure, and a low pressure oil pump is provided for supplying an actuating oil having a low actuating pressure. A selector valve is provided for selectively applying the low actuating pressure to the forward or reverse hydraulic chambers. A pressure increasing valve is provided for applying a higher actuating pressure to the reverse hydraulic chamber than the forward hydraulic chamber.

8 Claims, No Drawings

SYSTEM FOR CONTROLLING THE PRESSURE OF OIL FOR A CONTINUOUSLY VARIABLE TRANSMISSION

BACKGROUND OF THE INVENTION

The present invention relates to a hydraulic control system for a continuously variable belt-drive automatic transmission for a motor vehicle, and more particularly to a system for controlling pressure of oil in a hydraulic circuit for the transmission.

A continuously variable transmission with a torque converter having a lockup clutch is known. The transmission is controlled by a high line pressure of 30 to 40 kg/cm$^2$ at maximum and the torque converter is controlled by a lower control pressure of 4 to 6 kg/cm$^2$. The transmission is further provided with a multiple-disk friction clutch in a selector device and a transfer clutch for a four-wheel drive system. These clutches are independently operated by respective pressures of the oil. Accordingly, it is necessary to control the respective pressures with accuracy.

Japanese Patent Laid Open No. 57-161360 (U.S. Pat. No. 4,478,105) discloses a system in which the pressure of oil from an oil pump is adjusted by a line pressure control valve for controlling drive and driven pulleys of the transmission. The line pressure control valve produces a control pressure for controlling a torque converter, a lockup clutch, a lockup control valve, a clutch and a brake for a selector device.

However, in such a system, the line pressure is applied to the clutch or brake in the selector device through a manually operated valve. The line pressure is greatly varied in accordance with the engine torque, and moreover flow rate of the oil is varied in accordance with the transmission ratio, so that the clutch pressure varies. Since the oil pump must supply oil to various devices at different pressures, an oil pump having a large discharge capacity is required, and hence pumping loss increases.

During reverse driving, reaction forces of input and output torque are exerted on a reverse brake of the selector device. Accordingly, it is necessary to provide a reverse brake having a torque capacity twice as much as the input torque. Unless the torque capacity of the reverse brake is sufficient because of a limitation of space of the device, the actuating pressure must be increased for the reverse brake. However, the pressure is too high for a forward clutch of the selector device, which is undesirable.

Further in such a system, if an abnormality occurs such as the decrease of the line pressure, a reduced line pressure is supplied to the clutch. Thus, the actuating pressure is lacking, causing the clutch to burn.

SUMMARY OF THE INVENTION

The object of the present invention is to provide a hydraulic control system which has an oil supply system for the transmission and an oil supply system for the selector device, thereby providing a necessary actuating pressure and protecting the clutch from damage.

According to the present invention, there is provided a system for controlling the pressure of oil for a continuously variable transmission for transmitting the power of an engine to the wheels of a vehicle, the transmission having a torque converter with a lockup clutch, and a selector device having a planetary gear device for selecting forward and reverse drives.

The system comprises the planetary gear device having a forward hydraulic chamber and a reverse hydraulic chamber for selectively providing a forward gear train and a reverse gear train, a high pressure oil pump for supplying a transmission actuating oil having a high line pressure, a low pressure oil pump for supplying an actuating oil having a low actuating pressure to the torque converter, both of the oil pumps being operatively connected to the engine to be driven by the engine, respectively, a hydraulic circuit communicating the low pressure oil pump with the forward hydraulic chamber and with the reverse hydraulic chamber, a selector valve provided in the hydraulic circuit for selectively applying the low actuating pressure to the forward and reverse hydraulic chambers. A pressure increasing valve is provided in the hydraulic circuit for applying a higher actuating pressure to the reverse hydraulic chamber than to the forward hydraulic chamber.

The pressure increasing valve is a relief valve according to a feature of the invention having a spool and a spring for urging the spool to produce a low actuating pressure for the forward hydraulic chamber, and a port applied with a pressure in the reverse hydraulic chamber, which is added to the force of the spring, so that the higher actuating pressure is produced.

The other objects and features of this invention will become understood from the following description with reference to the accompanying drawings.

DETAILED DESCRIPTION OF THE PREFERRED EMBODIMENT

Figure 1A:
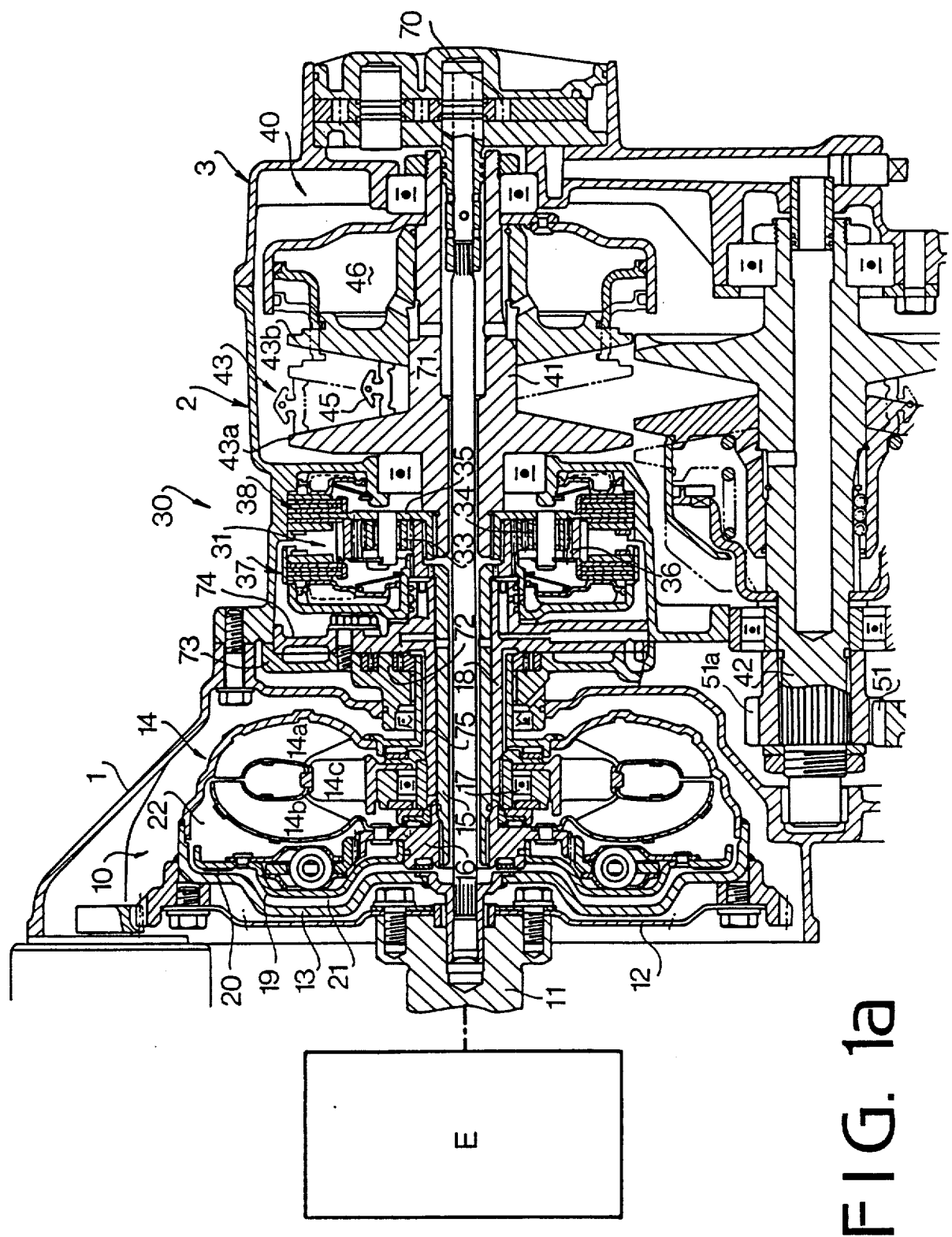
FIGS. 1a and 1b show a sectional view of a continuously variable belt-drive transmission to which the present invention is applied.
Figure 1B:
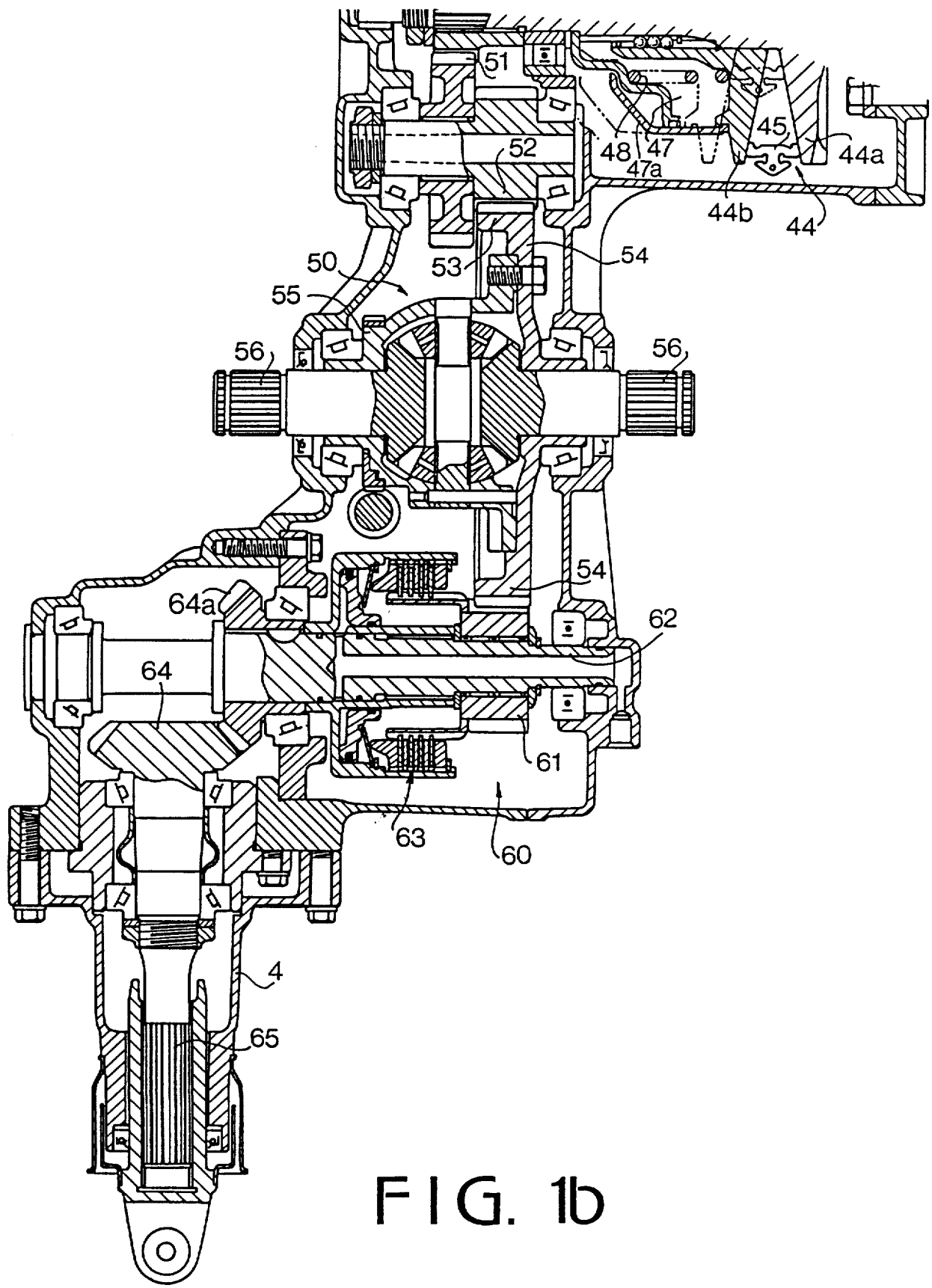

FIGS. 1a and 1b show a four-wheel drive power transmission system with a continuously variable belt-drive automatic transmission for a motor vehicle, to which the present invention is applied. An engine E is transversely mounted on a motor vehicle at a front portion thereof. The power transmission system comprises a torque converter device 10, a selector device 30, a continuously variable belt-drive transmission 40, a final reduction device 50, and a transfer device 60. The torque converter device 10 is provided in a housing 1. The selector device 30, transmission 40, final reduction and differential device 50 and transfer device 60 are provided in a main housing 2 and a side housing 3. An extension case 4 is secured to the housing 1.

The torque converter device 10 has a torque converter 14 with a lockup clutch 19. A drive plate 12 is fixed to a crankshaft 11 of the engine E. A converter cover 13 is secured to the drive plate 12. The torque converter 14 comprises an impeller 14a integral with the converter cover 13 by welding, a turbine 14b fixed to a turbine hub 16 which is splined to an input shaft 15, and a stator 14c connected to a hollow stator shaft 18 through a one-way clutch 17. The lockup clutch 19 is disposed between the converter cover 13 and the torque converter 14, and facing 20 of the lockup clutch 19 is attached for making a contact with the cover 13. Further, in the torque converter device 10, a release side oil chamber 21 is defined adjacent the converter cover 13 for applying release pressure to the lockup clutch 19, and an apply side oil chamber 22 is formed adjacent the torque converter 14 for applying lockup pressure to the lockup clutch 19.

The selector device 30 is a planetary gear type and comprises a planetary gear 31 having a pair of pinions 33 and 34, and a sun gear 32 mounted on the input shaft 15. Pinions 33 and 34 are supported on a carrier 35. The sun gear 32 is engaged with a ring gear 36 through pinions 33 and 34. A forward clutch 37 is disposed between the sun gear 32 and the ring gear 36. A reverse brake 38 is disposed between the ring gear 36 and the main case 2. At forward driving such as a drive range (D) selection, the forward clutch 37 is engaged to lock the sun gear 32. At reverse driving, the reverse brake 38 is engaged to lock the ring gear 36 for reversely rotating the carrier 35. If the number of teeth of the ring gear 36 is determined twice as many as that of the sun gear 32, a gear ratio at the reverse driving is equal to that at the forward driving.

The belt-drive transmission 40 has a main shaft 41 engaged with the carrier 35 and an output shaft 42 provided in parallel with the main shaft 41. A drive pulley (primary pulley) 43 and a driven pulley (secondary pulley) 44 are mounted on the main shaft 41 and the output shaft 42, respectively. A fixed conical disc 43a of the drive pulley 43 is integral with main shaft 41 and an axially movable conical disc 43b is axially slidably mounted on the main shaft 41. The movable conical disc 43b also slides in a cylinder 46 formed on the main shaft 41 to provide a servo device.

A fixed conical disc 44a of the driven pulley 44 is formed on the output shaft 42 opposite the movable conical disc 43b and a movable conical disc 44b is slidably mounted on the shaft 42 opposite the disc 43a. Movable conical disc 44b has a cylindrical portion which is slidably engaged in a cylinder 47 of the output shaft 42 to form a servo device. A spring 48 is provided to urge the movable conical disc 44b toward the fixed conical disc 44a. A drive belt 45 engages with the drive pulley 43 and the driven pulley 44. The cylinder 46 of the drive pulley 43 is so designed that the pressure receiving area thereof is larger than that of the cylinder 47 of the driven pulley 44. Thus, the running diameter of the belt 45 on the pulleys is varied dependent on driving conditions.

Secured to the output shaft 42 is a drive gear 51a of the final reduction device 50 which engages with an intermediate reduction gear 51 on an intermediate shaft 52. An intermediate gear 53 on the shaft 52 engages with a final reduction gear 54. The rotation of the final reduction gear 54 is transmitted to axles 56 of front driving wheels of the vehicle through a differential 55.

The transfer device 60 comprises a transfer gear 61 engaged with the final reduction gear 54 and rotatably mounted on a transfer shaft 62 which is transversely disposed and rotatably supported by bearings, and a transfer clutch 63 in the form of a fluid operated multiple-disk friction clutch. The transfer clutch 63 operates to couple the gear 61 with the shaft 62, so that the rotation of the gear 61 is transferred to rear drive wheels of the vehicle through shaft 62, bevel gear 64a secured to the shaft 62, bevel gear 64 engaged with the bevel gear 64a and rear drive shaft 65.

In the side housing 3, an oil pump 70 is provided for supplying a high pressure of oil for the transmission. The main shaft 41 has an axial passage in which an oil pump driving shaft 71 connected to the crankshaft 11 is rotatably mounted. An oil pump 72 for the torque converter device 10 is provided for supplying a low pressure of oil and is housed in a pump housing 73 and a cover 74 at the rear end of the housing 1. A pump drive shaft 75 is connected to the impeller 14a and is operatively connected with a rotor of the oil pump 72.

Thus, the oil pump 70 is disposed adjacent the transmission 40, and the oil pump 72 is disposed adjacent the torque converter device 10.

Figure 2A:
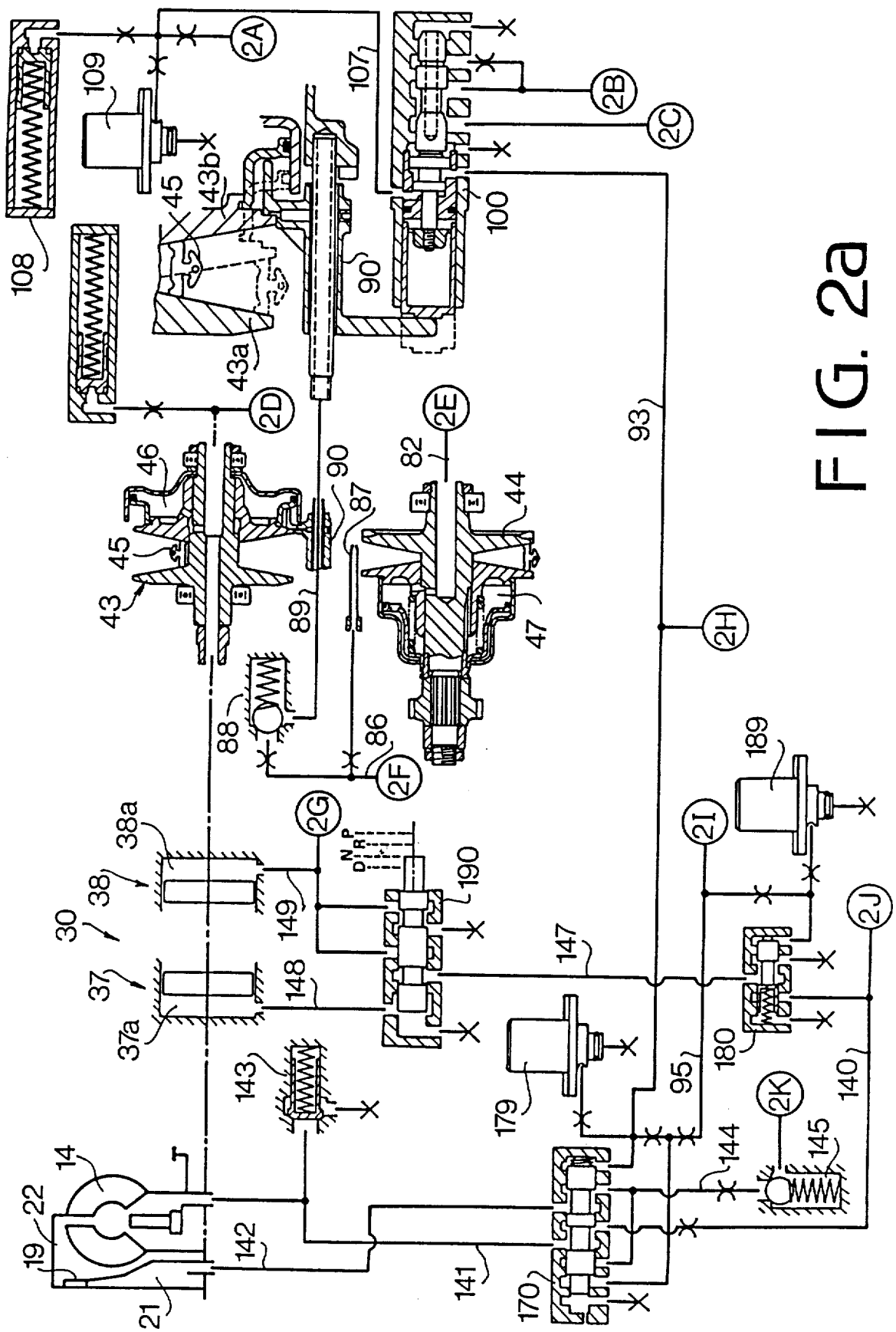
FIGS. 2a and 2b show a hydraulic actuating circuit according to the present invention.
Figure 2B:
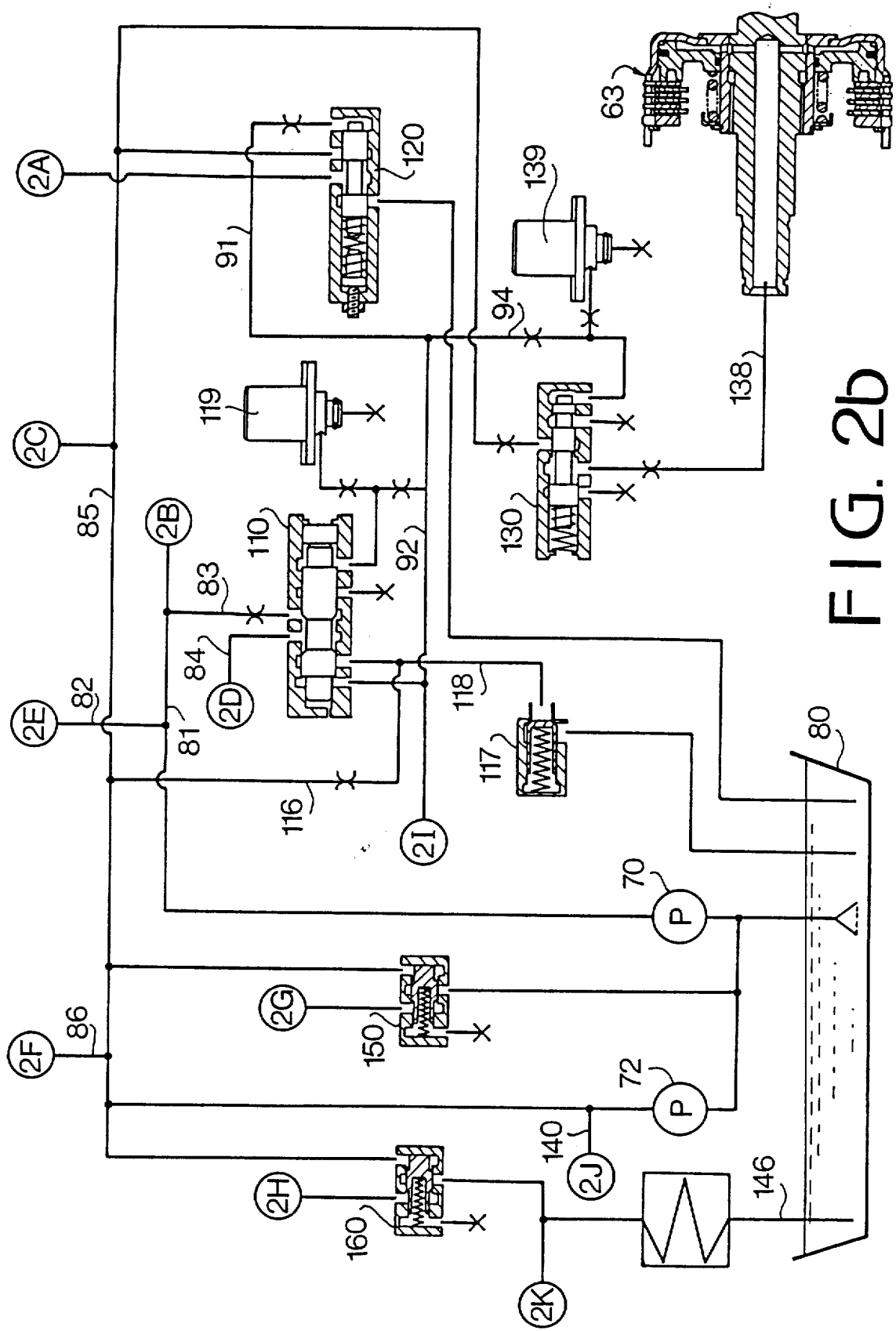

Referring to FIGS. 2a and 2b, showing a hydraulic control circuit, oil in an oil reservoir 80 is supplied to a line pressure control valve 100 through a line pressure passage 81 by the pump 70. An oil passage 82 connected to the passage 81 is communicated with the cylinder 47 of the driven pulley 44. The passage 81 is further communicated with a transmission ratio control valve 110 through a passage 83. The cylinder 46 of drive pulley 43 is applied with pressurized oil passing through the passage 81, passage 83, transmission ratio control valve 110, and a passage 84.

A passage 140 connected to the oil pump 72 is communicated with a passage 85. The pressure of oil supplied to the passage 85 is regulated by a pair of relief valves 150 and 160 to produce a low actuating pressure. The passage 85 is connected to a drain port of the line pressure control valve 100.

A part of the oil in the passage 85 is supplied to the drive pulley 44 from a nozzle 87 passing through a passage 86 to lubricate the pulley device. The passage 86 is further communicated with a passage 89 through a check valve 88. The passage 89 is communicated with a lubricating oil tube on which a transmission ratio sensing shoe 90 is slidably mounted.

The passage 85 is communicated with a reducing valve 120 for providing a constant reducing pressure of oil. A conduit 91 is communicated with the line pressure control valve 100 through a passage 107. The conduit 91 is also communicated with a solenoid operated on-off valve 109 and with an accumulator 108. Further, a conduit 91 is communicated with the transmission ratio control valve 110 through a passage 92 and with a solenoid operated on-off valve 119.

The solenoid operated valve 109 is adapted to be operated by duty signals for producing control pressure in the form of pulses and the pulsation of the pressure of oil is smoothed by the accumulator 108, and the control pressure is applied to the line pressure control valve 100. Further, the line pressure control valve 100 is applied with signals dependent on the transmission ratio from the sensing shoe 90 and on oil pressure through a passage 93 in accordance with conditions of the torque converter, so that the line pressure is controlled in accordance with the transmission ratio, engine torque, and torque increasing factor of the torque converter.

The solenoid operated valve 119 is also operated by duty signals and produces control pressure which is applied to the transmission ratio control valve 110 for shifting a spool of the valve 110 to an oil supply position and an oil drain position by the degree of duty cycle. The control pressure increases upon off state of the duty signal and reduces on state of the duty signal. Thus, the flow rate of oil supplied to or drained from the cylinder 46 of drive pulley 43 is controlled to provide optimum transmission ratio.

A drain passage 118 is communicated with the oil reservoir 80 through a check valve 117. A prefill passage 116 is provided between the passage 85 and a position upstream of the check valve 117. Thus, oil is supplied to the cylinder 46, even if the transmission ratio control valve 110 is in the drain state, thereby improving the starting characteristic.

The passage 85 is communicated with the transfer control valve 130, and a solenoid operated valve 139 for the transfer control valve 130 is communicated with the reducing valve 120 through a passage 94. The solenoid operated valve 139 actuates the transfer control valve 130 to produce clutch actuating pressure which is supplied to the transfer clutch 63 through a passage 138 for controlling clutch torque dependent on driving conditions.

The passage 140 is comminicated with the lockup control valve 170. The lockup control valve 170 is communicated with the torque converter 14 through a passage 141 and the release side oil chamber 21 of the lockup clutch 19 through a passage 142. A relief valve 143 is provided on the passage 141 for preventing increase of pressure in the torque converter 14 when the torque converter is locked up. A drain passage 144 of the lockup control valve 170 is communicated with the oil reservoir 80 through a check valve 145 and an oil cooler 146. The lockup control valve 170 is communicated with the reducing valve 120 through passages 95, 92 and 91 for supplying with the reducing pressure. The reducing pressure is also supplied to the passage 93 communicated with the line pressure control valve 100 and to a solenoid operated on-off valve 179. The solenoid operated valve 179 operates the lockup control valve 170 to communicate the passage 140 with the passage 141 or the passage 142, and to produce converter condition pressure in the passage 93.

The passage 140 is further communicated with a safety lock valve 180 which is connected to a selector valve 190 through a passage 147. The selector valve 190 is provided for selectively connecting passages in accordance with operations of a selector lever for selecting operational ranges such as a parking range (P), reverse range (R), neutral range (N), and drive range (D). The selector valve 190 is communicated with an actuating pressure chamber 37a of the forward clutch 37 through a passage 148 and with an actuating pressure chamber 38a of the reverse brake 38 through a passage 149.

Figure 3:
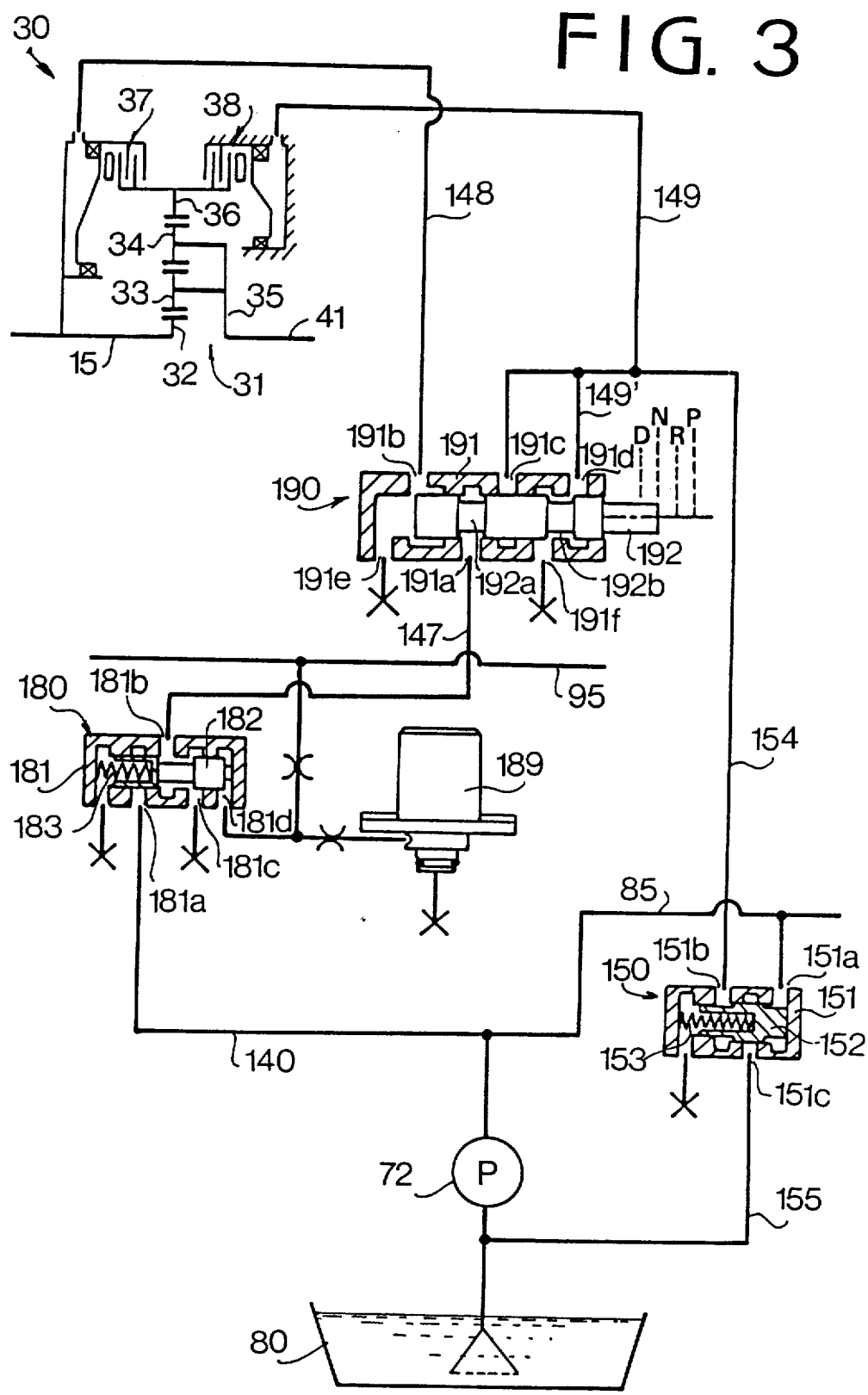
FIG. 3 is a diagram showing a part of the hydraulic control circuit.

Referring to FIG. 3, the selector valve 190 comprises a valve body 191, a spool 192 slidably mounted in the valve body 191 to be axially moved in accordance with operations of the shift lever. The valve body 191 has a port 191a communicated with the passage 147, a port 191b communicated with the passage 148, a port 191c communicated with the passage 149, a port 191d communicated with a passage 149' diverged from the passage 149, and a pair of drain ports 191e and 191f. The spool 192 has stems 192a and 192b formed between lands. In accordance with the positions of the stems 192a and 192b, the drain port 191e is communicated with the port 191b, and the drain port 191f is selectively communicated with the port 191c or the port 191d.

For example, when the N range is selected as shown in FIG. 3, the port 191a is closed by the lands formed opposite the stem 192a, the port 191b is communicated with the drain port 191e and the port 191d is communicated with the port 191f by the stem 192b.

In the P or N range selection, the selector valve 190 actuated to drain the oil in the forward clutch 37 and the reverse brake 38 for providing the neutral position. In the D range selection, the forward clutch 37 is supplied with the oil for providing the forward driving position. In the R range selection, the reverse brake 38 is supplied with the oil for providing the reverse driving position.

The control system for increasing the actuating pressure at reverse driving will be described hereinafter. The actuating pressure is controlled by the relief valve 150. As shown in FIG. 3, the relief valve 150 comprises a valve body 151, a spool 152, and a spring 153 urging the spool 152 to the right. The valve body 151 has a port 151a applied with the discharge pressure of the pump 72 through the passage 85, a port 151b applied with actuating pressure for the reverse brake 38 through the passage 154, and a drain port 151c communicated with an inlet port of the oil pump 72 through a passage 155.

Thus, the relief valve 150 regulates the pressure at two stages, one of which is a low actuating pressure produced by the force of the spring 153 and the other is a high actuating pressure which is produced by adding the actuating pressure for the reverse brake to the force of the spring 153.

In the relief valve 150, the relationship between actuating pressure $P_A$, reverse brake actuating pressure $P_R$, pressure receiving effective areas $S_A$ and $S_R$ of both sides of the spool 152, and spring load F is as follows.

$$P_A \cdot S_A = P_R \cdot S_R + F$$

Figure 4:
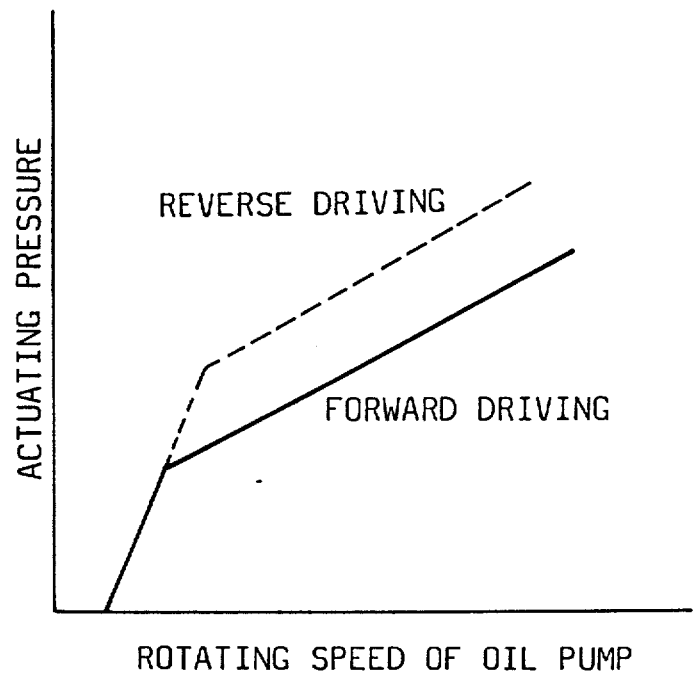
FIG. 4 is a graph showing a control pressure characteristic in accordance with a relief valve.

Accordingly, as shown in FIG. 4, when the reverse brake actuating pressure $P_R$ becomes zero at forward driving, a low actuating pressure $P_A$ is set. When the reverse brake actuating pressure is applied at reverse driving, a high actuating pressure is set. These characteristics are proportional to the rotating speed of the pump.

The safety lock valve 180 is provided to act in the abnormal state. As shown in FIG. 3, the safety lock valve 180 comprises a valve body 181, a spool 182, and a spring 183 urging the spool 182 to the right. The valve body 181 has a port 181a communicated with the passage 140, a port 181b communicated with the passage 147, a drain port 181c, and a port 181d communicated with a solenoid operated on-off valve 189. The solenoid operated on-off valve 189 is supplied with the reducing pressure of the reducing valve 120 through the passage 95. In a normal state, the safety lock valve 18/ operates to communicate the passage 140 with the passage 147 by the solenoid operated valve 189, so that the selector valve 190 is supplied with the actuating pressure. In abnormal state such as reduction of the actuating pressure, the solenoid valve 189 is turned off. The force of the spring 183 urges the spool 182 to the right to communicate the port 181b with the drain port 181c. Accordingly, the oil in the forward clutch 37 or the reverse brake 38 is forcibly drained through the passage 147 to disengage the transmission.

Describing operation of the system, the system supplies pulse signals to the solenoid operated valves 109, 119, 139, 179 and 189 to operate them at duty cycles dependent on driving conditions. When the engine starts, the oil pumps 70 and 72 are driven to supply oil to the system. The high line pressure is supplied by the oil pump 70 to the passage 81 and controlled by the line pressure control valve 100. The cylinder 47 of the driven pulley 44 is supplied with the line pressure adjusted by the line pressure control valve 100 through the passages 81, 82. Thus, the continuously variable transmission 40 provides the largest transmission ratio at low engine speed stage.

On the other hand, a low actuating pressure of oil adjusted by the relief valves 150 and 160 is supplied to passages 140 and 85. From the low actuating pressure, the reducing valve 120 produces a reducing pressure which is applied to solenoid operated valves 109, 119, 139, 179 and 189. The low actuating pressure is supplied to the transfer control valve 130 through the passage 85 to produce the clutch actuating pressure which is supplied to the transfer clutch 63. The actuating pressure is also supplied to the lockup control valve 170 through the passage 140. At starting of the vehicle, the passage 140 is communicated with the passage 142 by the operation of the solenoid operated valve 179. Thus, the pressure of oil is applied to the torque converter 14 through the release side oil chamber 21 and drained to the oil reservoir 80 through the passages 141 and 144. The lockup clutch 19 is disengaged and the torque converter 14 is in operating state.

When the P or N range is selected, oil in the chambers 37a and 38a of the forward clutch 37 and the reverse brake 38 are drained. Namely, when the P range is selected, the spool 192 of the selector valve 190 is shifted to communicate the port 191b with the drain port 191e and to communicate the port 191c with the drain port 191f through the stem 192a, thereby draining the oil in the chamber 37a of forward clutch 37 through the passage 148 and the oil in the chamber 38a of reverse brake 38 through the passage 149. When the N range is selected, the port 191a closes, the port 191b communicates with the drain port 191e, and the port 191d communicates with the drain port 191f through the stem 192b, as shown in FIG. 3. Thus, the oil in the forward clutch 37 is drained through the passage 148 and the oil in the reverse brake 38 is drained through the passages 149 and 149'. Thus, the planetary gear 31 is released to disengage the transmission 40.

When the D range is selected, the port 191a is communicated with the port 191b through the stem 192a. Thus, the actuating pressure in the passage 147 is applied to the forward clutch 37 through the passage 148 to lock the planetary gear 31, so that the input shaft 15 is engaged with the main shaft 41. Thus, the torque converter 14 operates to transmit the power of the engine to the automatic transmission 40. The power of the engine is transmitted to the output shaft 42 at the largest transmission ratio by the driving belt 45 and pulleys 43, 44, and further transmitted to the axles of the driving wheels through the final reduction device 50. Thus, the vehicle is started.

In this state, converter pressure is supplied to the line pressure control valve 100 by the operation of the lockup solenoid 179 through the passage 93 to increase the line pressure. The torque converter 14 multiplies the torque in accordance with the speed, and the multiplied torque is transmitted through the transmission 40 without slipping of the belt 45 due to the high line pressure.

After starting of the motor vehicle, when the torque converter 14 reaches a condition for a lockup range, and the solenoid operated valve 179 is turned off, the oil in the release side chamber 21 is drained through the passage 142 so that lockup clutch 19 is pushed by the oil pressure in the apply side chamber 22. Thus, the facing 20 comes in contact with the converter cover 13 to lock the crankshaft 11 and the lockup clutch 19, which means locking of the torque converter 14. Therefore, the engine power can be transmitted to the input shaft 15 through the lockup clutch 19.

In this state, converter pressure in the passage 93 becomes zero, so that the line pressure is controlled by the line pressure control valve 100 without the torque increasing factor, thereby preventing the line pressure supplied to the pulleys from exceeding. The transmission ratio control valve 110 is operated by solenoid valve 119, for controlling the pressure applied to the cylinder 46 of the drive pulley 43. Thus, the transmission ratio is controlled at a predetermined transmission ratio changing speed.

When the R range is selected, the port 191a is communicated with the port 191c through the stem 192a. Thus, the reverse brake 38 is supplied with the actuating pressure of oil through the passage 149 to reversely rotate the carrier 35 for providing a reverse driving. In this state, a high actuating pressure is supplied by the relief valve 150 in accordance with the reverse brake actuating pressure from the reverse brake 38 to increase the brake pressure of the reverse brake 38. Thus, the capacity of torque in the reverse brake 38 increases to effectively transmit the power.

At forward driving or reverse driving, if the actuating pressure abnormally reduces, the torque converter 14 and the lockup clutch 19 cannot transmit the power of the engine, and the vehicle cannot be driven. Further, the pressures of oil in the forward clutch 37 and the reverse brake 38 reduce. In such a state, the safety lock valve 180 is actuated by the solenoid operated valve 189 to forcibly drain the oil in the forward clutch 37 or the reverse brake 38, so that the transmission is disengaged. It is possible to push the vehicle to a safety place.

In accordance with the present invention, the system is provided with two oil pumps for supplying high pressure and low pressure to the transmission and the selector device respectively. Hence, a necessary actuating pressure is provided without the influence of the line pressure.

The actuating pressure for the clutch and the brake of the selector device is controlled by the relief valve, so that respective capacities at forward driving and reverse driving are sufficiently provided. Thus, excess brake capacity and an increase of pumping loss are avoided.

Since the safety lock valve is provided, burning of the brake or the clutch in the selector device is prevented.

While the presently preferred embodiment of the present invention has been shown and described, it is to be understood that this disclosure is for the purpose of illustration and that various changes and modifications may be made without departing from the scope of the invention as set forth in the appended claims.

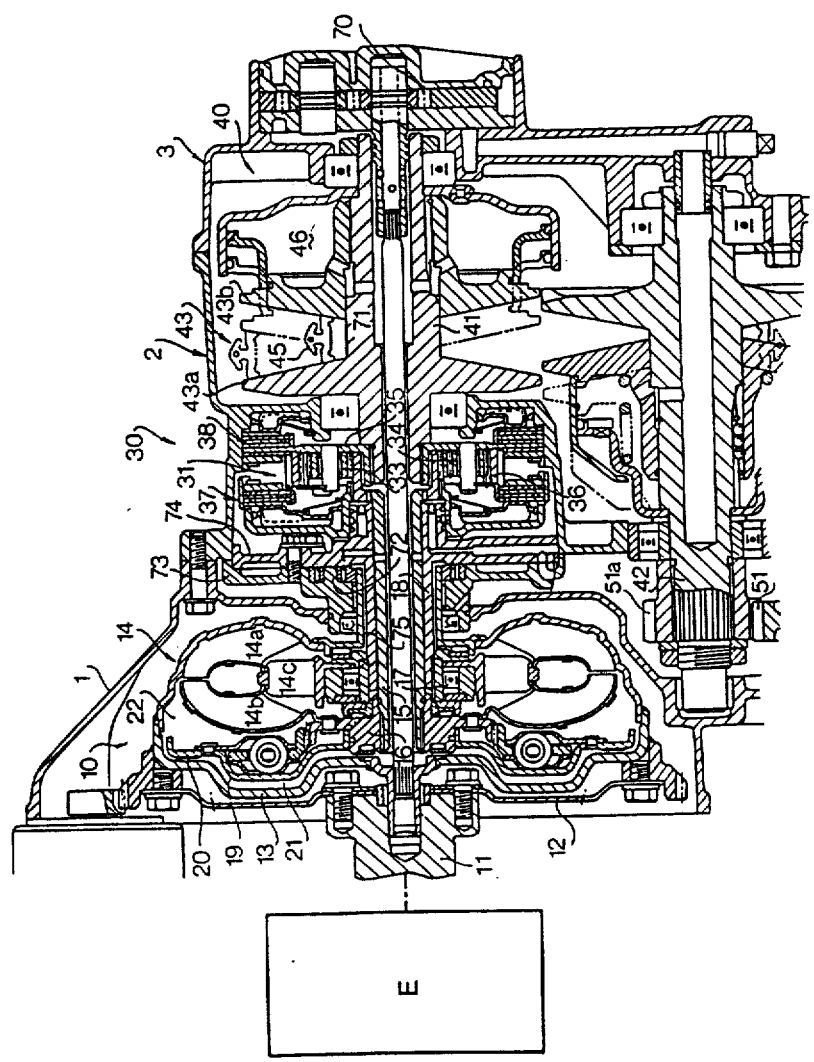

What is claimed is:

1. A system for controlling pressure of oil for a power transmission system for transmitting power of an engine to wheels of a vehicle, the transmission system having a torque converter device comprising a torque converter with a lockup clutch, a selector device having a planetary gear device for selecting forward and reverse drives, and a continuously variable transmission, the controlling system comprising:

the planetary gear device having a forward hydraulic chamber and a reverse hydraulic chamber for selectively engaging a forward gear train and a reverse gear train respectively;
a high pressure oil pump for supplying transmission actuating oil having a high line pressure to the continuously variable transmission;
a low pressure oil pump for supplying actuating oil having a low actuating pressure to the torque converter device;
both of the oil pumps being operatively connected to the engine so as to be driven by the engine, respectively;
a hydraulic circuit communicating the low pressure oil pump with the forward hydraulic chamber and with the reverse hydraulic chamber;
a selector valve provided in the hydraulic circuit for selectively applying the low actuating pressure to the forward and reverse hydraulic chambers; and
a pressure increasing valve provided in the hydraulic circuit for applying a higher actuating pressure to the reverse hydraulic chamber than to the forward hydraulic chamber.

2. The system according to claim 1 wherein the pressure increasing valve is a relief valve having a spool and a spring for urging the spool to produce a low actuating pressure for the forward hydraulic chamber, and port applied with a pressure in the reverse hydraulic chamber, which is added to the force of the spring, so that the higher actuating pressure is produced.

3. The system according to claim 1 further comprising a safety valve provided in the hydraulic circuit and an actuating device for actuating the safety valve in an abnormal state, for draining oil in the forward and reverse hydraulic chambers.

4. The system according to claim 1, wherein
said high pressure oil pump is located adjacent the continuously variable transmission,
said low pressure oil pump is located adjacent said torque converter.

5. The system according to claim 1, wherein
said torque converter device is connected between said engine and said continuously variable transmission.

6. The system according to claim 5, wherein
said selector device is connected between said torque converter and said continuously variable transmission.

7. The system according to claim 1, wherein
said torque converter device is connected between said engine and the continuously variable transmission.

8. The system according to claim 7, wherein
said selector device is connected between said torque converter and said continuously variable transmission.

* * * * *

UNITED STATES PATENT AND TRADEMARK OFFICE
CERTIFICATE OF CORRECTION

PATENT NO. : 4,850,937                                                                    Page 1 of 8

DATED : July 25, 1989

INVENTOR(S) : Sakai

It is certified that error appears in the above-identified patent and that said Letters Patent is hereby corrected as shown below:

The title page should be deleted to appear as per attached title page.

The sheets of drawings consisting of figures 1a, 1b, 2a, 2b, 3 and 4 should be inserted as per attached sheets.

Signed and Sealed this

First Day of January, 1991

Attest:

HARRY F. MANBECK, JR.

*Attesting Officer*                        *Commissioner of Patents and Trademarks*

United States Patent [19]

Sakai

[11] Patent Number: 4,850,937
[45] Date of Patent: Jul. 25, 1989

[54] SYSTEM FOR CONTROLLING THE PRESSURE OF OIL FOR A CONTINUOUSLY VARIABLE TRANSMISSION

[75] Inventor: Yasuhito Sakai, Higashimurayama, Japan

[73] Assignee: Fuji Jukogyo Kabushiki Kaisha, Tokyo, Japan

[21] Appl. No.: 198,391

[22] Filed: May 24, 1988

[30] Foreign Application Priority Data

May 28, 1987 [JP] Japan .................................. 62-134461
May 28, 1987 [JP] Japan .................................. 62-134464

[51] Int. Cl.⁴ ............................................. F16H 11/02
[52] U.S. Cl. ............................................. 474/28; 74/867
[58] Field of Search .................... 474/11, 12, 17, 18, 474/28, 69, 70; 74/865, 867, 868, 869

[56] References Cited

U.S. PATENT DOCUMENTS 4,478,105 10/1984 Yamamura et al. .................. 74/730
4,547,178 10/1985 Hayakawa et al. ............... 474/28 X
4,669,336 6/1987 Okada et al. ........................ 74/867

FOREIGN PATENT DOCUMENTS 57-161360 10/1982 Japan .

Primary Examiner—Thuy M. Bui
Attorney, Agent, or Firm—Martin A. Farber

[57] ABSTRACT

A continuously variable transmission has a selector device having a planetary gear device for selecting forward and reverse drives. The planetary gear device has a forward hydraulic chamber and a reverse hydraulic chamber for selectively providing a forward gear train and a reverse gear train. A high pressure oil pump is provided for supplying a transmission actuating oil having a high line pressure, and a low pressure oil pump is provided for supplying an actuating oil having a low actuating pressure. A selector valve is provided for selectively applying the low actuating pressure to the forward or reverse hydraulic chambers. A pressure increasing valve is provided for applying a higher actuating pressure to the reverse hydraulic chamber than the forward hydraulic chamber.

8 Claims, No Drawings